June 15, 1937.  M. P. WINTHER  2,083,585
AIR CONDITIONING SYSTEM
Original Filed Dec. 26, 1931
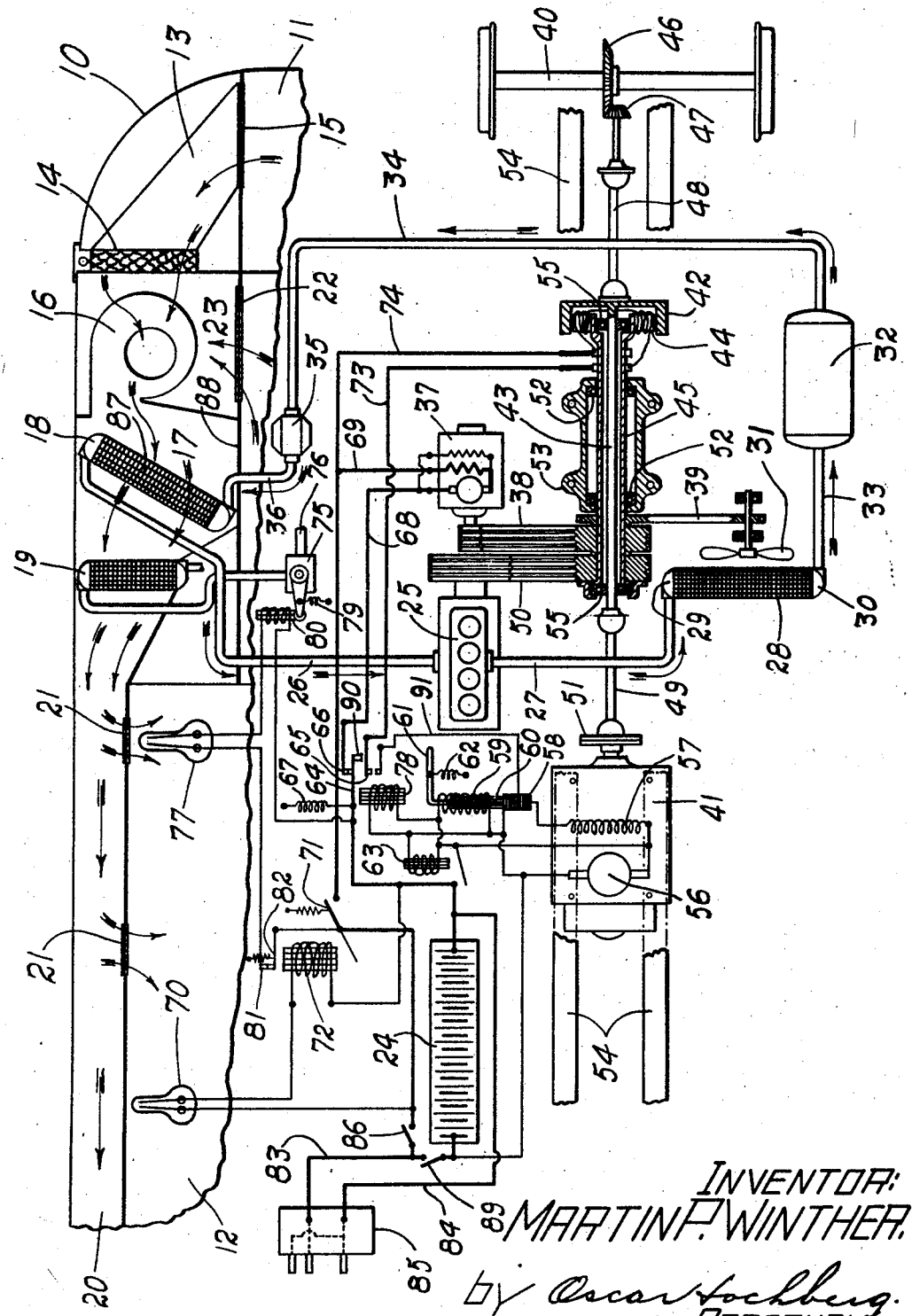
INVENTOR:
MARTIN P. WINTHER.
by Oscar Hochberg.
his ATTORNEY Patented June 15, 1937

2,083,585

UNITED STATES PATENT OFFICE 2,083,585

AIR CONDITIONING SYSTEM

Martin P. Winther, Waukegan, Ill., assignor to Pullman-Standard Car Manufacturing Company, a corporation of Delaware Original application December 26, 1931, Serial No. 583,210. Divided and this application January 2, 1934, Serial No. 704,843. Renewed April 4, 1936

3 Claims. (Cl. 257—7)

The invention relates generally to air conditioning systems for railway cars and utilizing preferably refrigerating systems of the compression type adapted to be driven by mechanism operated directly from the truck axle through the medium of an electric clutch device forming part of the propeller shaft assembly.

The invention more specifically contemplates the use of a non-toxic refrigerant in the refrigerating circuit and preferably dispenses with secordary cooling circuits heretofore employed for transferring heat from the car interior to the refrigerating apparatus.

The invention makes further provision for continuous operation of the refrigerating system by secondary drive mechanism energized at relatively low car speed levels or when the generator output falls below a predetermined voltage.

The invention also comprehends thermostatic control of the refrigerating system whereby the compressor may be operated or cut out when the temperature in the car reaches critical stages above or below predetermined points on the thermometer and independently of car speed or generator voltage.

The invention embodies means for heating of the car in cold weather and provides for thermostatic control of the heating medium whereby the heat control circuit is broken when the refrigerating mechanism is in use and closed when the refrigerating mechanism is not in operation.

In air conditioning systems previously used, three separate circuits have been necessary to provide secondary refrigerating systems for cooling the air of the car since is was desirable that the primary refrigerating circuit, containing a volatile fluid, usually toxic, be installed outside the car to avoid contamination of the air stream within the car resulting from possible leakage of the refrigerant from the circulating conduits. Then too, it was necessary to provide cooling water for the condenser and compressor, the water being drawn from a cooling tower to which it was returned in the form of a spray and again cooled by a fan at the tower position and again pumped through another cycle in the circuit.

The brine for cooling had first to be conducted through an evaporator tank in the primary refrigerant circuit where it gave up its heat to the surrounding refrigerant, thence to the cooling coil in the air stream where it absorbed heat and was again returned to the evaporator tank. In addition to the pumps required for the brine and water circuits, it was necessary to provide a fan to cool the water spray in the water tower and separate motors for each of these devices and essential water storage tank, piping, valves, wiring and switches incident to such installation.

In view of the multiplicity of parts in the several circuits designed to function independently of parts in associated circuits, and the requirement that the system carrying the primary refrigerant be confined to positions outside the car to avoid possible injury to car occupants resulting from the toxic character of such liquid in the event of leakage in the system, coupled with the difficulty in accommodating such apparatus in the limited space available within and beneath the car and the resultant high cost of maintenance and excessive weight of such equipment, these considerations rendered the general adoption of available air conditioning apparatus little short of prohibitive. The electrical equipment thus required by the several pump, fan and compressor motors taxed the capacity of the special generator designed to drive them and unduly stressed the generator drive mechanism connection at the axle.

This application is a division of my application, Serial No. 583,210, filed December 26, 1931, for Air conditioning system.

It is the province of this invention to provide an air conditioning system having positive drive connection with the car axle, and providing complete electrical control for starting and stopping the refrigerating mechanism independently of the drive and car speed.

A further object is to provide a dual drive for the system directly from the car axle to effect continuous operation of the compressor in the refrigerating circuit above a predetermined minimum car speed.

A further and important purpose is the provision of a dual drive shaft adapted for direct connection with the generator and compressor elements of the refrigerating system and fitted with an electric clutch device operable to permit independent or simultaneous operation of the shaft parts and the generator and compressor elements respectively.

The foregoing and other advantages are obtained and objections overcome by the mechanism illustrated in the accompanying drawing in which is shown, diagrammatically, the installation of the air conditioning mechanism upon a railway car having a suitable air duct system above the passenger space in the car. In said drawing the cooling and heating apparatus and generator and battery equipment with electrical control circuits connecting the several units are schematically indicated. The car 10 may be provided with a vestibule 11 at one of its ends from which fresh air may be drawn to the car interior 12.

An intake duct 13 leading to an air filter 14 communicates with the vestibule through register 15, the air being drawn in by means of a blower 16 through the filter to chamber 17 containing an evaporator 18 and radiator 19 communicating with ducts 20 extending along the car with outlets 21 opening to the car interior. The air in the car may be re-circulated by drawing the air through intake 22 in mixing chamber 23 from which it is again returned with a supply of new air to the evaporator coils in chamber 17 to be cooled, through the ducts, thence through emission openings 21 to car interior, without again passing such re-circulated air through the filter 14, but conditioned to provide an ample supply of clean and healthful air to the passengers.

The heat exchange or evaporator 18 forms the air cooling unit of the refrigerating system which comprises the reciprocating compressor 25 adapted to withdraw the heated gases from evaporator 18 through connecting pipe 26 and compressing the gas into pipe 27 and thence to a condenser of the conventional type having a bank of fin piping 28 communicating with headers 29 and 30 at their upper and lower ends, respectively. The refrigerant from the compressor enters the header 29 under pressure and is condensed in the pipes 28 during its passage to the lower header 30 by the cooling action of the fan 31 directly connected to primary drive mechanism hereinafter referred to, whereby a current of air is forced through the bank of condenser pipes 28.

From the condenser, the now liquid refrigerant flows into a liquid receiver 32 from pipe 33 connecting receiver with condenser head 30, from which it is forced upwardly through pipe 34 to expansion valve 35 and under reduced pressure through pipe 36 whence it enters the cooling coil or evaporator unit 18 to be again vaporized by the heat taken up from the air stream from the blower 16, and the heated gas is again withdrawn from the evaporator as before for re-admission to the cycle. The units of the refrigerant cycle outlined constitute the entire mechanism of the system for the direct cooling of the air stream, the use of a non-toxic refrigerant making possible the complete elimination of the brine and water circuits heretofore considered indispensable.

The system of direct cooling of the air as above described renders practicable the driving of the moving parts directly from the truck axle 40 since that may be done with a minimum power loss through the electric clutch, gear and belt elements of the drive mechanism to be presently described. The driving mechanism performs the functions of a direct drive for the power supply generator 41 and a similar drive for the compressor 25 of the refrigerating system as will hereinafter appear, the two drives, though associated, being capable of united or independent operation through the medium of an electric clutch device having its ring member 42 fixed to the generator drive shaft 43 and its coil member 44 secured to the compressor drive shaft 45.

This shaft drive assembly may be designated the primary drive mechanism and is operable directly from the axle through the bevel gear 46 and bevel pinion 47, flexible shaft 48, clutch shaft 43, and flexible shaft 49 to the generator, and from the clutch ring 42, to coil member 44 when energized, to quill shaft 45 to compressor 25 through belt 50 and to condenser fan 31 through belt 39. It will be noted that the generator and motor heretofore used to drive the compressor have been eliminated, but one generator 41 being used to supply power for lighting purposes and to charge storage battery 24 providing a secondary source of power for auxiliary compressor drive motor 37 flexibly connected to compressor 25 by means of driving belt 38 to quill shaft 45, which is then disengaged from the electric clutch ring 42, thence through belt 50 to the compressor. Thus two sources of energy are made available for driving the compressor, one the direct or primary drive from the car axle without the use of intervening generator and motor before noted, and a secondary or auxiliary drive from an electric motor supplied from the storage battery.

Provision is made to prevent shock to generator armature and supporting gear from sudden stoppage of the car. Between the armature shaft and driving shaft section 49 is interposed a friction clutch device 51 of any suitable type designed to permit slippage between armature and drive at torques above those required for driving the generator. If desired, such clutch may be positioned on the drive shaft section 48 and adjacent electric clutch ring 42, should that disposition be found more convenient. As indicated on the drawing, the quill shaft portion 45 of the direct drive is journaled in bearings 52 fitted in a supporting frame 53 secured to the underside of center sills 54 of the car. The quill shaft thus supported is itself formed to accommodate bearings 55, preferably at opposite ends of the shaft, within which is supported the generator drive shaft portion 43 carrying the electric clutch ring 42.

The generator is likewise secured to the center sill in position for axial connection with the driving shaft portion 49 and conveniently accessible for inspection. The generator 41 is indicated diagrammatically with its commutator designated as 56 and shunt field 57 and its voltage regulated by carbon pile 58 connected in series with the field circuit 57 for controlling generator excitation, and the solenoid 59, the plunger 60 of which acts directly on the carbon pile 58.

The plunger of the solenoid is held against the carbon pile by the bent arm 61 through the spring 62 which is adjusted to balance the magnetic pull of the coil on plunger 60 since the solenoid coil 59 is connected directly across the armature 56 and therefore directly affected by generator output, so that with decreasing current through coil 59, plunger 60 operates to compress the carbon pile 58 to raise the field current and increase generator voltage. Provision for closing the battery circuit for charging is made by placing a relay coil 63 directly across the terminals of solenoid coil 59 for actuation by voltage output of the generator.

When generator voltage is above a predetermined minimum, switch arm 64 will through medium of insulated buffer 90, place point 65 in contact with wire 91, but when the voltage drops below the effective minimum, the arm 64 will contact with point 66. The relay arm 64, though actuated by relay 78, will normally bear against point 66 under pull of spring 67 designed to close point 66 when relay coil 78 is not fully energized so that the circuits 68 and 69 leading to the compressor motor 37 will be energized from the battery 24, provided the car thermostat 70, positioned in the cold zone above the floor of the car and controlling the cooling of the car, has closed switch 71 through relay 72 when either the electric motor will be energized from the battery or the electric clutch coils 44. Since the speed of the car determines the voltage of generator 41, the voltage of the generator will determine the position of relay arm 64.

If the car speed is high, the current from generator 41 will move relay arm 64 by means of insulated buffer 90, and place point 65 in contact with wire 91 to energize the electric clutch coils 44 through circuits 73 and 74 to drive the compressor 25 directly from quill shaft 45 through belt 50. If the car is standing still or when the generator voltage drops below the effective minimum, the relay arm 64 will contact with point 66 to close circuits 68 and 69 to energize the electric motor from the battery to drive the compressor 25.

The invention further provides for the heating of the car in cold weather by means of the radiator 19 supplied with hot water vapor or steam through valve 75 communicating with a source of steam supply 76, the valve being controlled by thermostat 77 positioned adjacent duct outlet 21. The steam valve 75 is held normally closed by the tension of spring 79 and is actuated by relay 80 controlled by heat thermostat 77 whenever the temperature of the warm air stream from the duct openings 21 falls below a predetermined minimum comfortable to the passengers.

The change automatically from cold to warm weather operation of the system is effected through the medium of a switch 81 controlled by cold thermometer 70 and relay 72. With relay arm 82 in contact with point 81, the circuit to relay 80 is energized to open the steam valve 75, but when the cooling system is in operation the circuit from battery 24 to the steam valve relay 80 is broken by the opening of switch 81 when relay arm 82 has been actuated by relay 72 even though the heat thermostat 77 may also be closed, thereby insuring the complete separation of cooling and heating circuits whenever the air in the car rises to a predetermined temperature at which the thermostat 70 becomes operative to energize relay 72 to close the circuits 68—69 to the electric motor 37 or circuits 73—74 to the electric clutch coils 44, to start the compressor 25.

The electro-dynamic drive members 42 and 44 connecting the positive drive to the compressor will act almost as a solid clutch with practically no slip in the drive at comparatively low speeds. When relatively high speeds are attained and the compressor is operating at maximum permissible speed with capacity output, the drive speeds of the clutch parts will automatically change because of the decreased current supply to the field coils 44 when carbon pile 58 is actuated for generator field control.

The driving clutch ring 42 may increase its speed without proportionately increasing the speed of the driven coil member 44 directly connected to the compressor so that the compressor speed may be maintained within its rated capacity independently of the relatively high speed of the driving clutch ring 42 due to the lag in the driven clutch member 44. As the speed of the train advances, the generator voltage increases and the carbon pile 58 is actuated to regulate the current flow into the coils of driven clutch member 44 and thereby regulating the speed of the compressor by varying the slip between clutch members 42 and 44. It will be noted that the drive from the axle may rotate the compressor 25 in clockwise or counter-clockwise direction but that the motor 37 driving the compressor will always rotate the compressor in one and the same direction unless the motor wiring is arranged to change the motor rotation. Thus it becomes possible for the axle drive to rotate the compressor in a direction reverse of that obtained when motor 37 becomes operative. When car speed is increased, the generator voltage builds up to energize relay 78 which draws arm 64 away from contact 66 to open the circuit to the motor, whereupon the buffer 90 on arm 64 will press contact point 65 against the contact on wire 91 to close the circuit energizing the driven clutch members 44 thereby to transfer the drive from the motor 37 to quill shaft 45 directly connected to the compressor. Therefore, the change from motor to axle drive takes place at a rotative speed sufficiently low to nullify the effects of rotation reversal.

In the placement of the evaporator 18, the fin pipes 87 are preferably placed at an angle to the direction of the air stream from the blower 16 to provide impinging planes for the air passing through the cooling coil so that the fin surfaces will collect moisture condensed upon them by the rapid extraction of heat from the moving air and allow it to drain off to a drip pan 88 beneath the coils. The evaporator thus acts to dehumidify the air entering the car, both new and recirculated, to maintain the atmosphere within the car comfortable to the passengers and in sanitary condition.

Provision is made for charging the battery 24 by power lines available at all railroad terminals. For this purpose, the battery circuit lines 83 and 84 are extended to a charging receptacle 85 of standard type adapted to receive the supply plug of the station power lines. A manually operated switch 86, normally closed, is conveniently placed in the battery circuit 83—84 to cut off the current from the whole system when repairs or replacements are being made. Further provision is made for energizing the compressor drive motor directly from the station power lines during protracted stops at stations or for the purpose of pre-cooling the car at terminal points to avoid excessive drafts upon the storage battery supply. A manually operable switch 89, normally closed, is interposed in the battery circuit to permit operation of compressor motor directly from the power lines through the charging plug 85 without drawing upon the battery for its current supply.

In the practical application of the invention, all of the moving parts of the mechanical refrigeration system have been mounted upon a small sub-frame beneath the car in position to be readily dismantled and serviced. The system also effects considerable economy in the reduction in the size of the switches resulting from the reduction in the amount of current required for its operation.

It will be noted that the entire air conditioning system is effectively and automatically controlled by the operation of electrical thermostats 70 and 77 so positioned in the car as to be instantly responsive to critical changes in the temperature of the incoming air and that already delivered to maintain a uniform mean temperature throughout the car interior in warm and cold weather. The system is compact and simple and economically maintained since the parts are rugged and relatively few in number and may be accommodated in less space on the car than is possible with systems heretofore proposed and of like capacity.

It will be observed that the heat thermostat 77 is directly in the path of the conditioned air being delivered into the car whereas the cooling thermostat 70 is somewhat removed from the stream of conditioned air entering the car from the duct. This is because better comfort conditions may be obtained in the car when the heating system is controlled by the temperature of the air immediately after it has traversed the heat-adding means, and when the cooling system is controlled by the more or less average temperature condition of the air in the enclosure.

Electro-magnetic clutch field control is provided through a portion of generator field control carbon pile 58, through wire 91 from contact 65. The insulated actuating buffer 90 serves to move contact 65 into engagement with contact on wire 91. A separate carbon pile may be used for controlling field current to coils 44 instead of the scheme shown. The position at which wire 91 is connected to carbon pile 58 depends upon the value of the electric clutch coils 44. In the arrangement as shown, the voltage to coils 44 is less than the generator or battery voltage, being tapped off at a point between the negative and positive terminals of carbon pile 58 which is in series with generator field coil 57.

What I claim is:—

1. In an air conditioning system for controlling the temperature of air within an enclosure, a cooling system including means for extracting heat units from the air to be conditioned, a cooling thermostat exposed to the air after traversing said means and an electrical circuit responsive to the cooling thermostat, a heating system including means for adding heat units to the air to be conditioned, a heating thermostat exposed to the air after traversing the heat-adding means but spaced from the cooling thermostat, and an electrical circuit responsive to the heating thermostat, and means for rendering one of said electrical circuits ineffective whenever the other of said electrical circuits is operative to effect a change in temperature of the air being conditioned.

2. In an air conditioning system for controlling the temperature of air within an enclosure, a cooling system including means for extracting heat units from the air to be conditioned, a cooling thermostat responsive to an average temperature condition of the air in the enclosure and an electrical circuit responsive to the cooling thermostat, a heating system including means for adding heat units to the air to be conditioned, a heating thermostat exposed to the stream of conditioned air entering the enclosure, and an electrical circuit responsive to the heating thermostat, and means for rendering one of said electrical circuits ineffective whenever the other of said electrical circuits is operative to effect a change in temperature of the air being conditioned.

3. In a vehicle, the combination comprising refrigerating mechanism and a separate heating mechanism including a radiator and supply valve, separate relay means for differentiating between said mechanisms, automatic switch mechanism for connecting said mechanisms controlled by certain of said relays, and separate high and low temperature thermostatic means selectively controlling said relay and valve, and means for energizing said switch control relay for opening the valve relay circuit independently of the high temperature thermostat to disconnect the heating mechanism.

MARTIN P. WINTHER.